United States Patent [19]
Hyde et al.

[11] Patent Number: 5,779,006
[45] Date of Patent: Jul. 14, 1998

[54] COMPOSITE FRICTION DISK HAVING REPLACEABLE WEAR FACES

[75] Inventors: Robert William Hyde, Beavercreek; William Terry Holzworth, Springfield; Bradley John Baden, Troy; Gary Charles Riebe, Tipp City, all of Ohio

[73] Assignee: The B. F. Goodrich Company, Richfield, Ohio

[21] Appl. No.: 716,121

[22] Filed: Sep. 19, 1996

Related U.S. Application Data

[63] Continuation-in-part of Ser. No. 449,437, May 24, 1995, Pat. No. 5,558,186.

[51] Int. Cl.$^6$ ........................................ F16D 69/00
[52] U.S. Cl. ........................... 188/250 D; 188/71.5; 188/250 G
[58] Field of Search ........................ 188/218 XL, 71.5, 188/73.2, 250 R, 250 C, 250 D, 250 G, 250 B, 234, 238, 242, 243, 250 E, 257, 258, 18 A; 192/107 R, 109 B, 70.13; 244/110 A

[56] References Cited

U.S. PATENT DOCUMENTS

| | | | |
|---|---|---|---|
| 3,708,042 | 1/1973 | Krause et al. | 188/218 XL |
| 3,913,716 | 10/1975 | Sedlock | 188/218 XL |
| 3,920,108 | 11/1975 | Ely | 188/218 XL |
| 4,580,673 | 4/1986 | Graton | 192/107 R |
| 5,407,032 | 4/1995 | Gaudefroy et al. | 188/58 |
| 5,429,216 | 7/1995 | Kahr | 188/250 E |

FOREIGN PATENT DOCUMENTS

| | | | |
|---|---|---|---|
| 341487A | 5/1934 | Belgium. | |
| 1218486 | 5/1960 | France. | |
| 1425296 | 11/1968 | Germany. | |
| 2106290 | 9/1971 | Germany | 188/218 X |
| 2363427 | 6/1975 | Germany | F16D 13/64 |
| 2524803 | 12/1975 | Germany | 188/218 XL |
| 211031 | 12/1983 | Japan | 188/264 G |
| 2286926 | 11/1990 | Japan | F16D 65/12 |
| 343235 | 1/1960 | Sweden | 188/218 XL |
| 1496341 | 12/1977 | United Kingdom | F16D 65/12 |
| 2045878 | 11/1980 | United Kingdom | F16D 69/04 |
| 2151729 | 7/1985 | United Kingdom | 188/218 XL |
| 2148187 | 3/1987 | United Kingdom | B32B 5/26 |
| 2191830 | 12/1987 | United Kingdom | F16D 89/04 |

OTHER PUBLICATIONS

The Economic and Safety Aspects of Commercial Aircraft Carbon Brakes by Fitzgerald and Lockwood–Goose Apr. 21, 1982.

*Primary Examiner*—Robert J. Oberleitner
*Assistant Examiner*—C. T. Bartz
*Attorney, Agent, or Firm*—David M. Ronyak

[57] ABSTRACT

A friction brake includes a friction disk assembly having high dynamic stability against undesired vibration during a braking event. The friction disk assembly comprises an annular structural carrier of carbon and/or ceramic or other suitable structual material, preferably a fiber reinforced composite material, including a plurality of recessed regions and torque drive notches spaced around its circumferential direction, and a friction lining of carbon and/or ceramic or other suitable structural material, preferably a fiber reinforced composite material, mounted on the carrier, the friction lining having a flat wear (rubbing) face and an obverse face including raised areas corresponding to and matingly engaging the recessed regions of the carrier to prevent rotation of the lining relative to the carrier. The lining may be formed of of virgin or recycled carbon, ceramic or other suitable friction material. The lining may be retained to the carrier by mechanical fasteners such as rivets or clips. The assembly may be refurbished by simple replacement of the worn lining without need of machining. The carrier and the lining are preferably formed as unitary annular members.

30 Claims, 9 Drawing Sheets

COMPOSITE FRICTION DISK HAVING REPLACEABLE WEAR FACES

This application is a Continuation-in-Part of U.S. application Ser. No. 08/449,437 filed May 24, 1995 in the names of Robert William Hyde et al. entitled Friction Disk with Replaceable Wear Faces, now U.S. Pat. No. 5,558,186 issued Sep. 24, 1996.

BACKGROUND OF THE INVENTION

This invention relates to friction brake assemblies, particularly of the type having axially aligned alternating rotatable and stationary brake disks carried between and axially movable between a pressure plate and a reaction plate, and more particularly to an improved friction disk for use in such an assembly, suitable for use in the brake stack of an aircraft wheel and brake assembly.

Carbon brake disks have come to be employed in many aircraft braking applications. The carbon of which these disks are formed is very costly to manufacture. Such carbon or graphite disks have been commonly discarded when the friction surfaces of the disk are sufficiently worn. Many techniques have been proposed to maximize utilization of this expensive carbon material. Such prior art efforts include replacement of a single full thickness disk with two disks of reduced thickness (Article entitled "The Economic and Safety Aspects of Commercial Carbon Brakes", Apr. 18–21, 1982 by L. FitzGerald and B. Lockwood-Goose), riveting carbon wear plates to a structural carbon or graphite core disk (U.S. Pat. Nos. 3,712,427 and 3,800,392 and to Cook et al.), riveting carbon wear facings to a core disk formed of beryllium segments (U.S. Pat. No. 3,731,769 to Ely), bonding new friction facings to the carbon core of a used disk (GB 2148187B), and splitting two worn disks to form two thinner half disks and bonding one of them to each side of a carbon core to form a new disk (U.S. Pat. No. 4,982,818 to Pigford). Brake disks with removable carbon friction pads are described in U.S. Pat. No. 3,708,042 to Krause et al. and GB 2151729A to Lacombe et al. U.S. Pat. No. 4,846,326 to Tilton et al. describes a friction clutch in which carbon disks are coupled by radial slots to a metallic hub containing slot-matching fingers. Notwithstanding the foregoing efforts, there remains a desire to enhance carbon utilization.

Also, certain carbon multi-disk brakes have exhibited undesirable vibration characteristics during an aircraft braking action, which if severe, can result in structural damage to the aircraft. These undesired vibration characteristics are also referred to as a lack of dynamic stability. Prior art efforts to reduce such undesired vibrations include replacement of a single full thickness disk with two disks of reduced thickness having positioned between them a thin damper of carbon composite material different from that of the main brake disk members (U.S. Pat. No. 4,585,096 to Bok, EP-B 0020389 to Enright, and U.S. Pat. No. 5,143,184 to Snyder et al.). Notwithstanding these prior efforts, there remains a desire to further improve the dynamic stability of carbon or ceramic composite brakes.

SUMMARY OF THE INVENTION

The present invention provides a friction disk in which the wear surface(s) of the disk is/are mechanically attached to the associated carrier and may be easily renewed by replacement, and the structural carrier can be reused, a method for refurbishing such a friction disk, and a multi-disk brake assembly including such a friction disk. The carrier includes an annular strap with a plurality of legs extending radially therefrom thereby forming a plurality of circumferentially spaced apart recesses. The obverse face of the lining (obverse to the friction face) includes raised areas of a shape that is complementary to the shape of the recesses of the carrier. The walls of the raised areas of the lining matingly engage the walls of the recesses of the carrier thereby locating the lining and providing a large bearing surface for transfer of torque during a braking action, thereby preventing rotation of the lining relative to the carrier. The forces generated during a braking action are transmitted from the lining to the carrier through compression loading of the contacting walls and through shear loading of a large area of the the lining material. In these preferred embodiments, the braking forces are not transferred through the fasteners which retain the lining in position on the carrier. The carrier is formed of carbon or ceramic or other suitable structural material, preferably composite material, preferably a fiber-reinforced carbon or ceramic composite material, capable of retaining sufficient structural properties at the temperatures and other conditions to be encountered in service. The lining material may be formed from carbon, ceramic or other friction material, including that remaining after being used in any of the foregoing prior art methods or from virgin carbon, ceramic or other friction material. Because the carrier and lining are separately manufactured, each may be optimized easily for its purpose, in contrast to single piece brake disks of carbon or ceramic material. The lining may be retained on the carrier by rivets extending through the lining or by clips engaged with a peripheral edge of the lining, thereby avoiding interruption of the swept area of the lining.

In comparison to conventional carbon disk aircraft brakes, preferred embodiments incorporating disk assemblies according to the invention have exhibited reduced dynamic vibration during various braking actions such as may occur during operation of an aircraft. Also, where very thick disks are involved, preferred embodiments of carbon disk assemblies according to the invention utilize components that may be manufactured in less time and at lower cost.

According to an aspect of the invention there is provided a friction disk comprising an annular carrier of carbon or ceramic material including a plurality of recessed regions and a plurality of torque drive notches spaced around its circumferential direction, and an annular friction lining of carbon or ceramic material mounted on the carrier, the friction lining having a flat wear face and an obverse face including raised areas having walls corresponding to and matingly engaging the walls of the recessed regions of the carrier to provide torque transfer capability between the lining and the carrier.

According to another aspect of the invention there is provided an aircraft brake assembly having a brake stack comprising a plurality of interleaved stator and rotor friction disks wherein at least one of the disks in the brake stack comprises an annular carrier of carbon or ceramic material including a plurality of recessed regions and a plurality of torque drive notches spaced around its circumferential direction, and a friction lining of carbon or ceramic material mounted on the carrier, the friction lining having a flat wear face and an obverse face including raised areas having walls corresponding to and matingly engaging the walls of the recessed regions of the carrier to provide torque transfer capability between the lining and the carrier.

According to another aspect of the invention there is provided a method of refurbishing a worn friction disk comprising an annular carrier of carbon or ceramic material including a plurality of recessed regions and torque drive notches spaced around its circumferential direction, and a friction lining of fiber reinforced carbon or ceramic material mounted on the carrier, the friction lining having a flat wear face and an obverse face including raised areas corresponding in shape and height and matingly engaging recessed regions of the carrier that correspond in shape and depth to provide torque transfer capability between the lining and the carrier, the method comprising replacing the worn friction lining with new friction lining of fiber reinforced carbon or ceramic material to provide a desired assembly thickness, the new friction lining having a flat wear face and an obverse face including raised areas having walls corresponding to and matingly engaging the walls of recessed regions of the carrier to provide torque transfer capability between the lining and the carrier.

For a more complete understanding of the invention and its advantages, reference should be had to the following detailed description and the accompanying drawings in which there is shown and described a preferred embodiment of the invention, in which like parts bear identical reference numbers.

DETAILED DESCRIPTION

Figure 1:
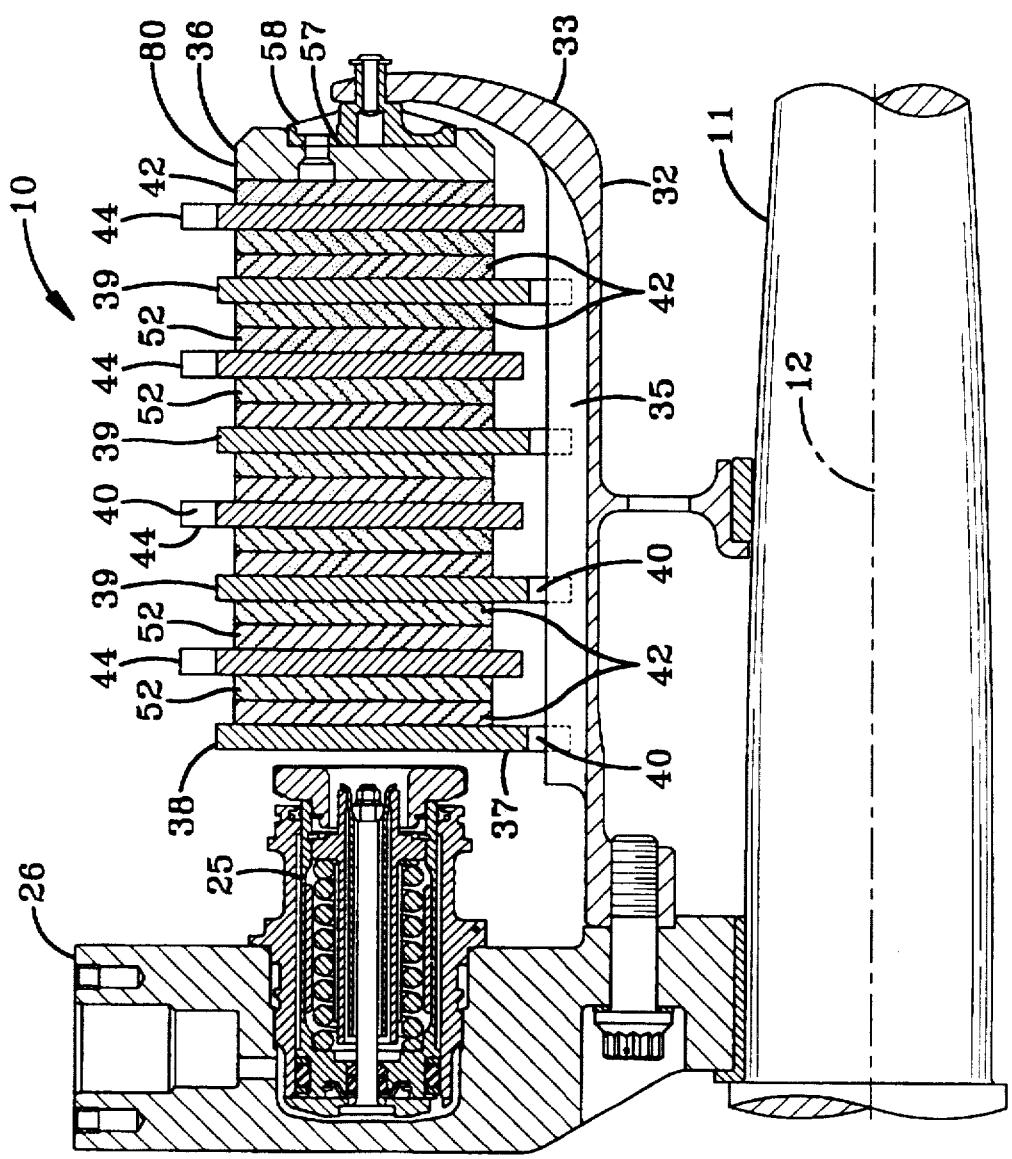
FIG. 1 is a schematic cross-sectional view of an aircraft brake assembly showing a piston housing with an actuating cylinder, pressure plate, torque tube and brake stack.
Figure 2:
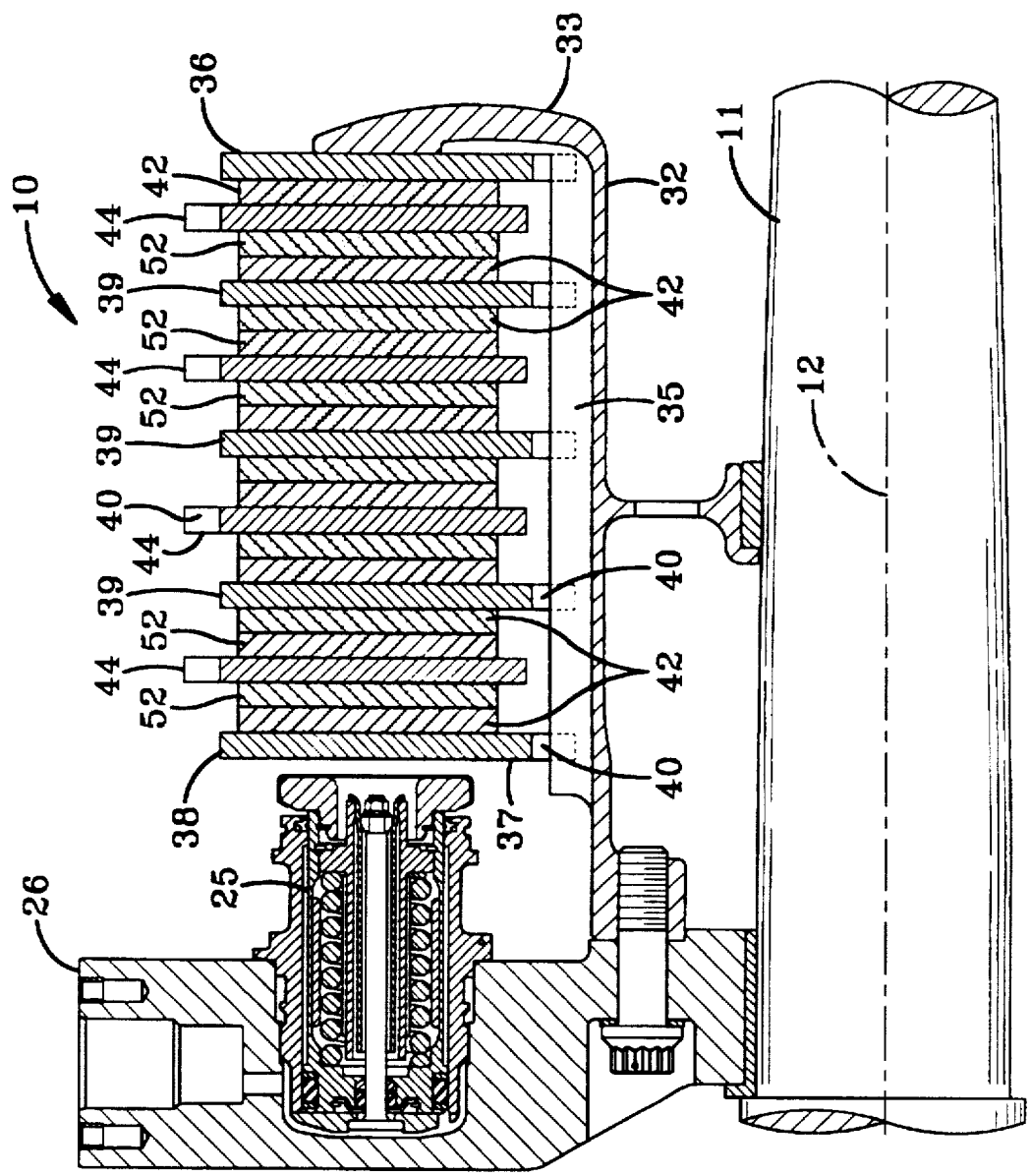
FIG. 2 is a schematic cross-sectional view of an aircraft brake assembly showing a piston housing with an actuating cylinder, pressure plate, alternate torque tube and brake stack.

Referring to the drawings, wherein like reference numerals designate like or corresponding parts throughout the several views, there is schematically depicted in FIGS. 1 and 2 a friction brake mechanism 10 mounted on axle 1 for use with a cylindrical wheel (not illustrated) rotatable about axial centerline 12 in a manner fully described in U.S. Pat. No. 4,018,082 to Rastogi et al., U.S. Pat. No. 4,878,563 to Baden et al., and U.S. Pat. No. 5,248,013 to Hogue et al. The friction brake mechanism 10 includes a pressure plate 38 adjacent the hydraulic piston motor 25, an end plate 36 distal from the piston motor, and a plurality of interleaved rotor disks 44 and stator disks 39 which together form the brake heat sink or brake stack. The friction brake mechanism 10 also includes a torque tube 32 on which the pressure plate 38, end plate 36 and stator disks 39 are slidably mounted against rotation relative to the wheel and rotor disks 44.

Torque tube 32 includes a reaction plate 33 at its end distal the piston motor 25. The reaction plate 33 may be made integral with the torque tube 32 as shown in FIG. 1 or may be made as a separate annular piece and suitably connected to the stationary torque tube 32. Torque tube 32 has a plurality of circumferentially spaced splines 35 that are axially extending. Splines 35 on torque tube 32 support an axially moveable nonrotatable pressure plate 38 and axially moveable nonrotatable stator disks 39. All of such stator disks 39 and pressure plate 38 have notches 40 in the form of slotted openings at circumferentially spaced locations on their inner periphery for captive engagement by the spline members 35 as is old and well known in the art. The respective annular stator disks 39 each have friction linings 42 secured to opposite faces thereof as shown in FIGS. 1 and 2. Pressure plate 38 also has a friction lining 42 on one surface thereof to act in concert with the other friction linings 42 when a braking action occurs. An end plate 36 carrying an annular friction lining 42 is suitably connected to the flared end 33 of the torque tube 32 and acts in concert with the stator disks 39 and the pressure plate 38 to be further described herein.

A plurality of axially spaced rotor disks 44 interleaved between the pressure plate 38 and the stator disks 39, have a plurality of circumferentially spaced notches 40 along their outer periphery for engagement by corresponding ribs secured to or integral with the inner periphery of the wheel. The annular rotor disks 44 are each formed of an annular carrier 45 having mechanically attached friction linings 52 to be further described herein.

Such stator disks 39 with their friction linings 42 and rotor disks 44 with their friction linings 52 acting together during a braking action provide a heat sink. The number and size of the disks may be varied as is necessary for the application involved. The circumferentially spaced notches 40 on the inner periphery 41 of the stator disk carriers 43 and on the outer periphery 46 of the rotor disk carriers 45 may accommodate reinforcing inserts such as reinforcing inserts 47 shown in FIG. 3 and more fully described in U.S. Pat. No. 4,469,204 to Bok et al. to provide reinforcement to the walls of such slotted openings and to enhance the life of such slots. Such reinforcing inserts are also referred to as drive clips.

The actuating mechanism for the brake includes a plurality of hydraulic piston assemblies 25 circumferentially spaced around the annular piston housing 26 in known manner. Only one piston assembly is shown in FIGS. 1 and 2. Upon actuation by fluid pressure, the piston motors 25 effect a braking action by moving the pressure plate 38 and the stator disks 39 into frictional engagement with the rotor disks 44 and against the reaction plate 33.

The pressure plate 38 is formed of carbon or ceramic composite material and has an annular friction lining 42 of carbon or ceramic composite material attached as by rivets 48 to the surface of pressure plate 38 opposite to the face of the pressure plate carrier 37 that receives the head of the hydraulic piston motors 25. The carrier 37 of pressure plate 38 is engaged to the torque tube 32 via slotted opening at circumferentially spaced locations on its inner periphery. The friction lining 42 is riveted to the pressure plate carrier 37 to locate the lining in position, but transfer of the braking forces, e.g. torque, from lining to carrier is through contact of the walls of raised areas 62 of the lining with the walls of recessed regions formed in the pressure plate carrier 37.

Figure 3:
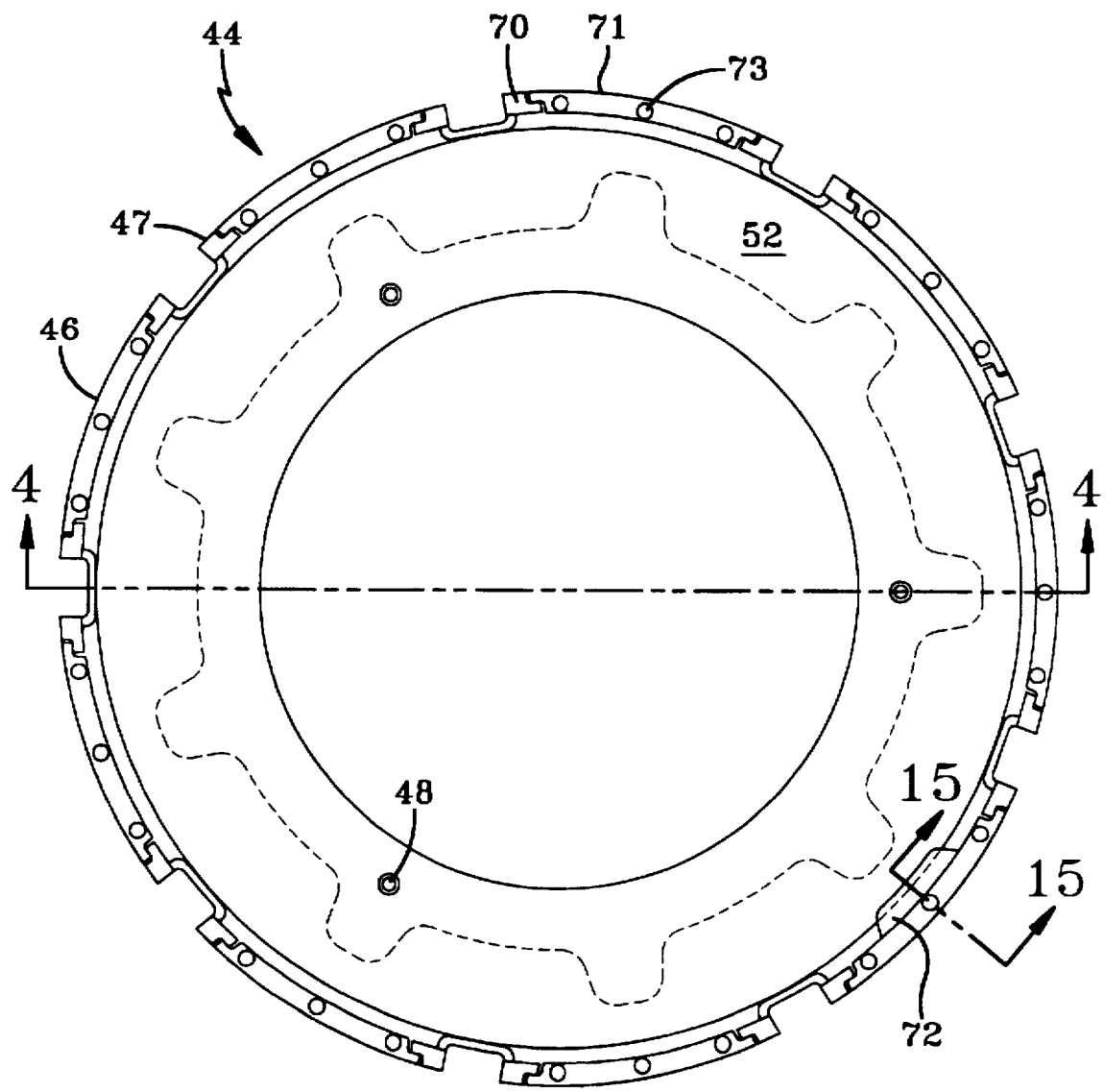
FIG. 3 is a plan view of a friction disk (rotor) according to the invention.
Figure 4:
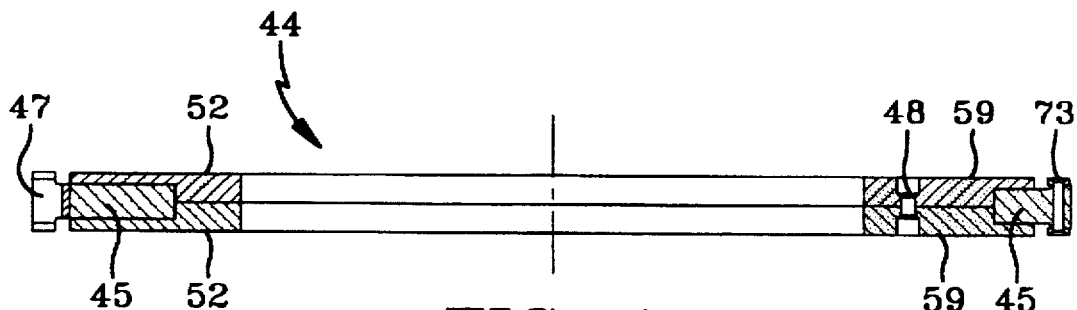
FIG. 4 is a sectional view taken along line 4—4 of FIG. 3.
Figure 15:
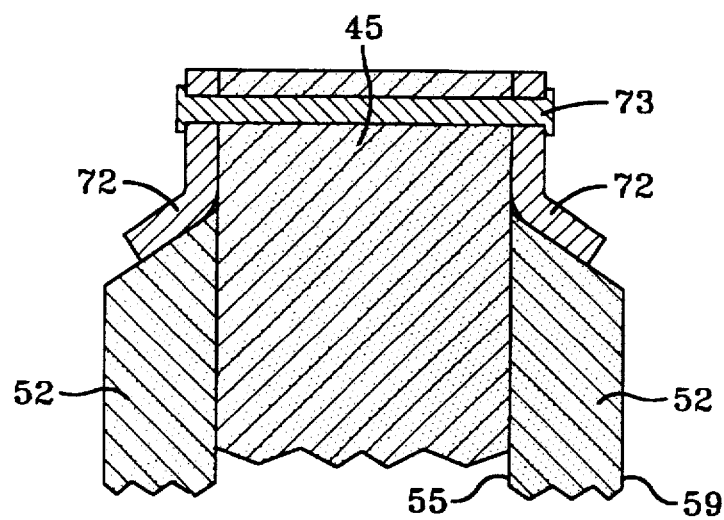
FIG. 15 is an enlarged sectional view taken along line 15—15 of FIG. 3.

Having reference to FIGS. 1 through 4, reference numeral 44 designates generally a rotor friction disk that is provided at spaced intervals on its outer periphery 46 with a plurality of notches 40. Notches 40 are adapted to receive the drive keys of a rotatable wheel assembly so that the rotor disks 44 are rotated with the wheel while being capable of axial movement relative to the wheel. Friction rotor disk 44 includes an annular carrier 45 and friction linings 52 secured thereto on opposite sides thereof by mechanical fasteners such as rivets 48. Alternatively, as shown in FIGS. 3 and 15, friction linings 52 may be provided with a beveled outer edge that is engaged by the flared extensions of the modified drive clip retainers 72 to secure the friction linings onto the associated carrier, thereby eliminating any discontinuities in the swept area of the wear face 59 of the linings. The standard drive clip retainers 71 and the modified drive clip retainers 72 are secured to the rotor carrier by rivets 73 which pass through apertures provided near the outer periphery of the carrier 45.

Figure 5:
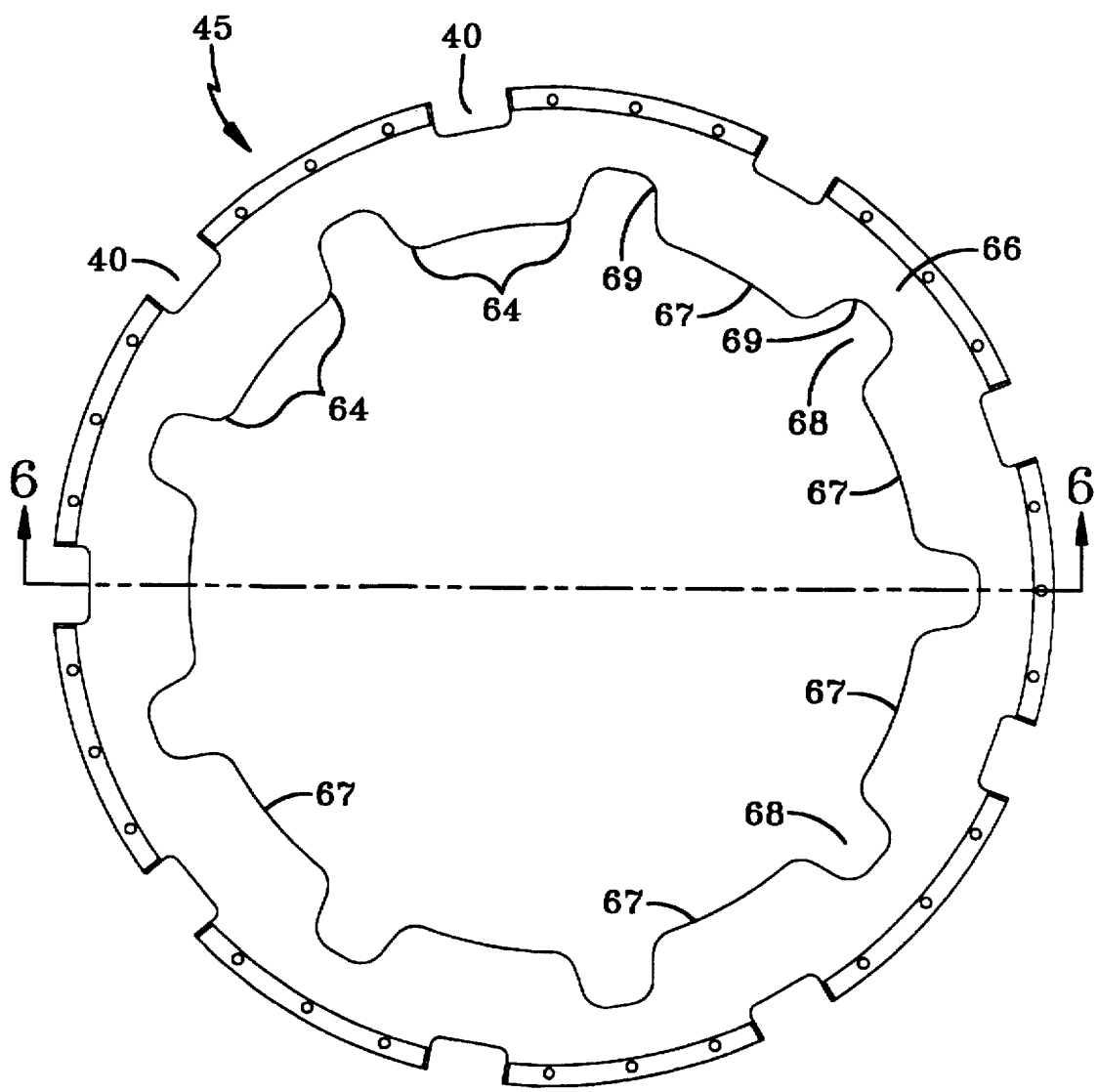
FIG. 5 is a plan view of the carrier of the friction disk of FIG. 3.
Figure 6:
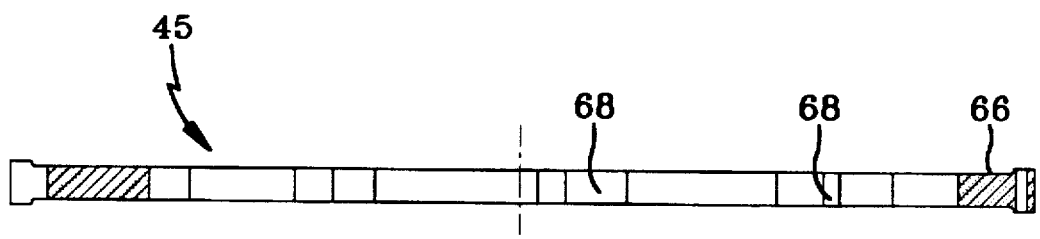
FIG. 6 is a sectional view taken along line 6—6 of FIG. 5.
Figure 7:
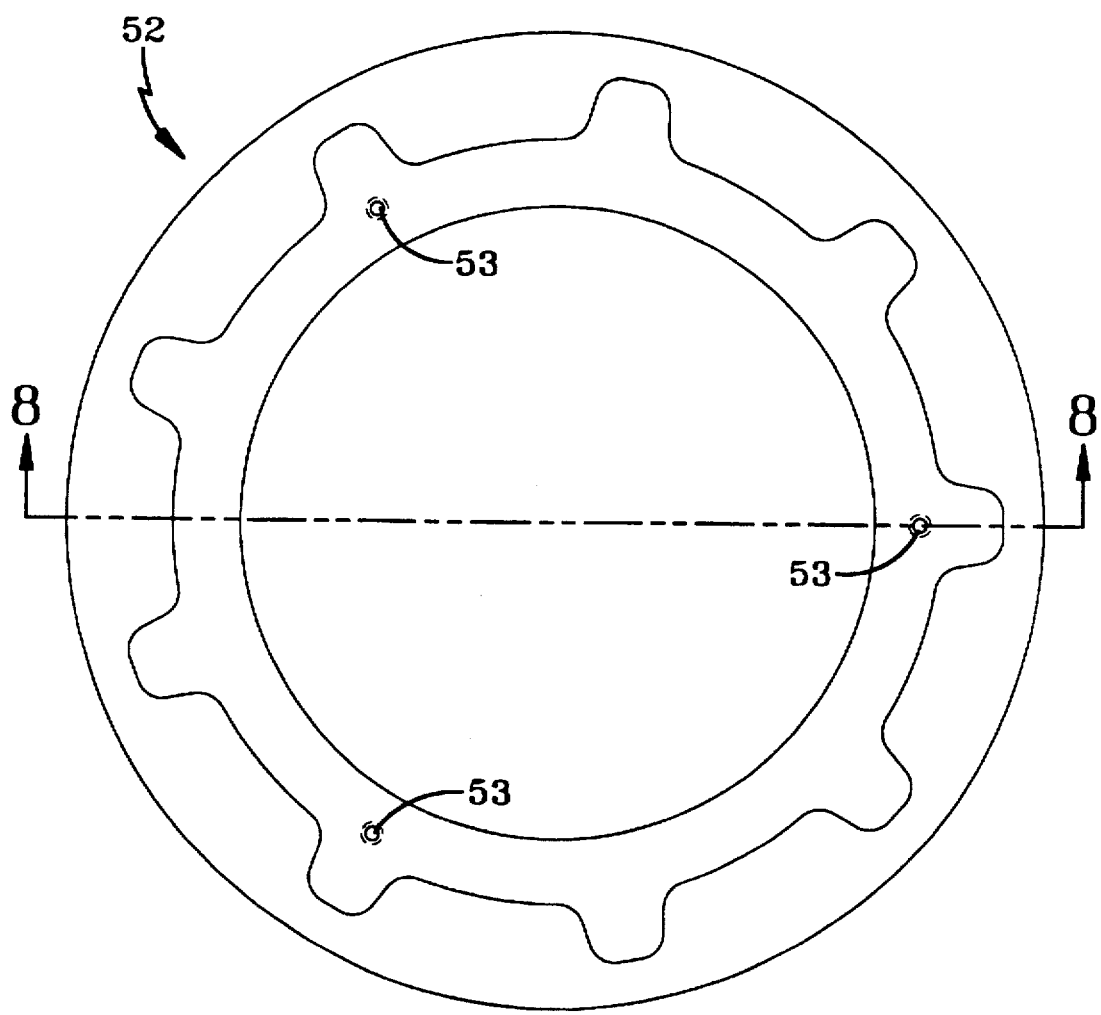
FIG. 7 is a plan view of a friction lining of the friction disk of FIG. 3.
Figure 8:
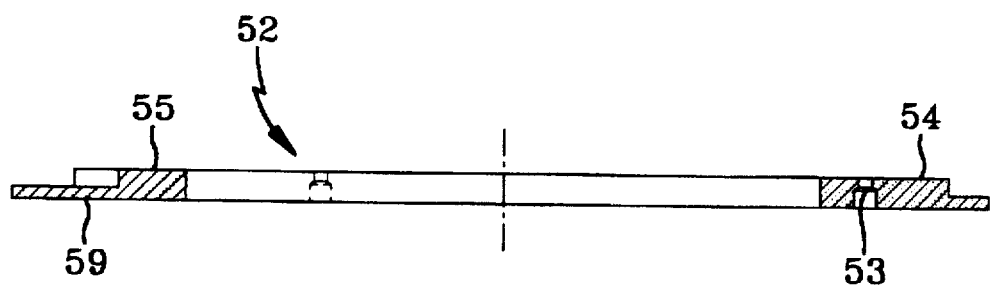
FIG. 8 is a sectional view taken along line 8—8 of FIG. 7.

The carrier 45 of friction rotor disk 44 is preferably formed of a composite material chosen for retention of its structural properties throughout prolonged thermal cycling, such as fiber reinforced carbon composite material available from The B. F. Goodrich Company under the trademark SUPER-CARB, or other carbon or ceramic composite material. As shown in FIGS. 5 and 6, the carrier 45 of a rotor disk 44 includes a circumferentially extending radially outer strap 66 provided at circumferentially spaced intervals with radially inwardly extending legs 67. In the particular embodiment shown in FIGS. 3 through 6, the carrier 45 includes an outer circumferentially extending strap 66 defining its outer periphery 46, with a plurality of legs 67 each subtending a substantial arc and extending radially inwardly from the strap 66 but not to the inner periphery of rotor disk 44. In the particular embodiment shown, the arc subtended by each leg 67 is about 25 degrees. The arcuate extent of each leg 67 overlaps and spans beyond the arcuate extent of the associated drive notch 40 to minimize the stresses developed between the drive notch 40 and the recess 68 between the associated pair adjacent legs 67. The plurality of spaces or recessed regions 68 between legs 67 are devoid of any material. The junctions 69 of the radially extending legs 67 with the circumferentially extending strap 66 and the tips 64 of legs 67 preferably are generously radiused to minimize stresses; this also provides bearing area for transfer of torque-induced forces between the friction lining 52 and the carrier 45 during a braking action.

When the carrier 37 is intended for use as a pressure plate 38 or end plate 36, recessed regions provided for torque transfer with raised areas 62 of lining 42 are formed without cutting completely through the thickness of the carrier. As shown in FIG. 1, when the carrier is intended for mounting on the reaction end 33 of the torque tube 32, additional recesses 57 may be formed in the face directed away from the piston motors 25 for engagement with the torque transfer buttons 58 secured to the flared reaction end 33 of the torque tube 32.

The carrier 37, 43, 45 is preferably formed as a single unitary member, e.g. by cutting from a sheet or flat plate of material or by molding. Carriers for all rotor disks and stator disks may be cut or machined from flat plate of the chosen material.

The friction lining 42, 52 may be formed of any suitable material chosen primarily for its frictional, wear resistance, thermal conductivity and heat capacity properties, and secondarily for its structural and oxidation resistance properties. The friction lining 42, 52 is preferably formed of material selected primarily for its tribological properties. The friction lining 42, 52 may be advantageously formed of carbon, graphite and/or ceramic material, preferably one that is a fiber reinforced composite. The friction lining 42, 52 is preferably in the form of an annular ring of a size corresponding to the respective carrier. Pads or sectors of carbon material have been found to wear much faster than continuous annular friction members of the same material. Because the friction linings 42, 52 do not directly engage the drive keys of the wheel or splines of the torque tube 32, the friction lining need not have the structural strength required of conventional disks formed entirely of carbon material. As shown in FIGS. 1, 2, 9, 10, 13 and 14, each stator friction lining 42 has a flat annular wear face or rubbing face 60 adapted for engagment with the opposing wear face 59 of an adjacent rotor friction lining 52. The obverse face 61 of each stator friction lining 42 has a plurality of raised areas 62 corresponding in shape to the recessed regions 64 of the carrier 37, 43 with which the lining is designed to be used. For pressure plate 38 and stator disk 39, the mating engagement of the periphery or walls of the raised areas 62 with the periphery or walls of the recessed regions 64 provides a large bearing surface for transfer of the forces generated during braking action, thereby preventing rotation of the friction lining 42 relative to the associated carrier 37, 43 and locates the position of the friction lining 42 relative to the associated carrier 37, 43. In similar manner for rotor disk 44, the mating engagement of the periphery or walls of the raised areas 54 of the obverse side 55 of lining 52 with the periphery or walls of the recessed regions 68 of rotor carrier 45 provides a large bearing surface for transfer of the forces generated during braking action, thereby preventing rotation of the friction lining 52 relative to the rotor carrier 45 and locates the position of the friction lining 52 relative to the carrier 44. To facilitate assembly of a friction disk according to the invention, preferably a profile clearance of about 0.010 inch is provided between the matingly configured peripheral walls of the carrier and its associated lining.

The friction linings 42 of the non-rotatable disks (pressure plate 38, end plate 36 and stator disks 39) may be and preferably are identical. The friction linings 52 of the rotor disks 44 may be and preferably are identical to one another but are different from friction linings 42 that are mounted on the non-rotatable disks. The thickness of the raised areas 62 of each friction lining 42 may be the same as or slightly less than but is preferably slightly more than one half of the thickness of the carrier 43 or the depth of the recessed areas provided in pressure plate carrier 37. The thickness of the raised areas 54 of each friction lining 52 may be the same as or slightly less than but is preferably slightly more than one half of the thickness of the carrier 45. Thus, when assembled to form a rotor disk 44 or stator disk 39 other than a pressure plate 38 or an end plate 36, the confronting faces of the raised areas 62, 54 of a pair of friction linings 42, 52 are in contact with and bear primarily on each other rather than on the associated carrier 45, 43, both when mounted and as a clamping load is applied during a braking action throughout the range of intended normal operating conditions. As an example not intended to limit the invention, for a carbon carrier having a thickness of about 0.65 inches, a nominal clearance of about 0.005 inches per side is preferably provided when carbon friction linings are employed. In the preferred embodiment shown, each friction lining 42, 52 includes a plurality of respective apertures 50, 53 extending therethrough in the thickness direction of the respective raised areas 62, 54. Apertures 50, 53 are adapted to receive recessed rivets 48, preferably of type 304 stainless steel, to secure the respective friction linings 42, 52 of a given disk to each other. Preferably, all rivets 48 of a disk lie on a common circle when the friction linings are formed of carbon to minimize the formation of wear tracks on wear faces 60, 59. Preferably, the rivets 48 are not tensioned against the friction lining 42, 52 when installed at ambient temperature to avoid cracking of the lining, and to ensure that upon thermal cycling during aircraft operation the rivets will not be tensioned and cause cracking or distortion of the friction lining, and to improve vibration damping.

Figure 9:
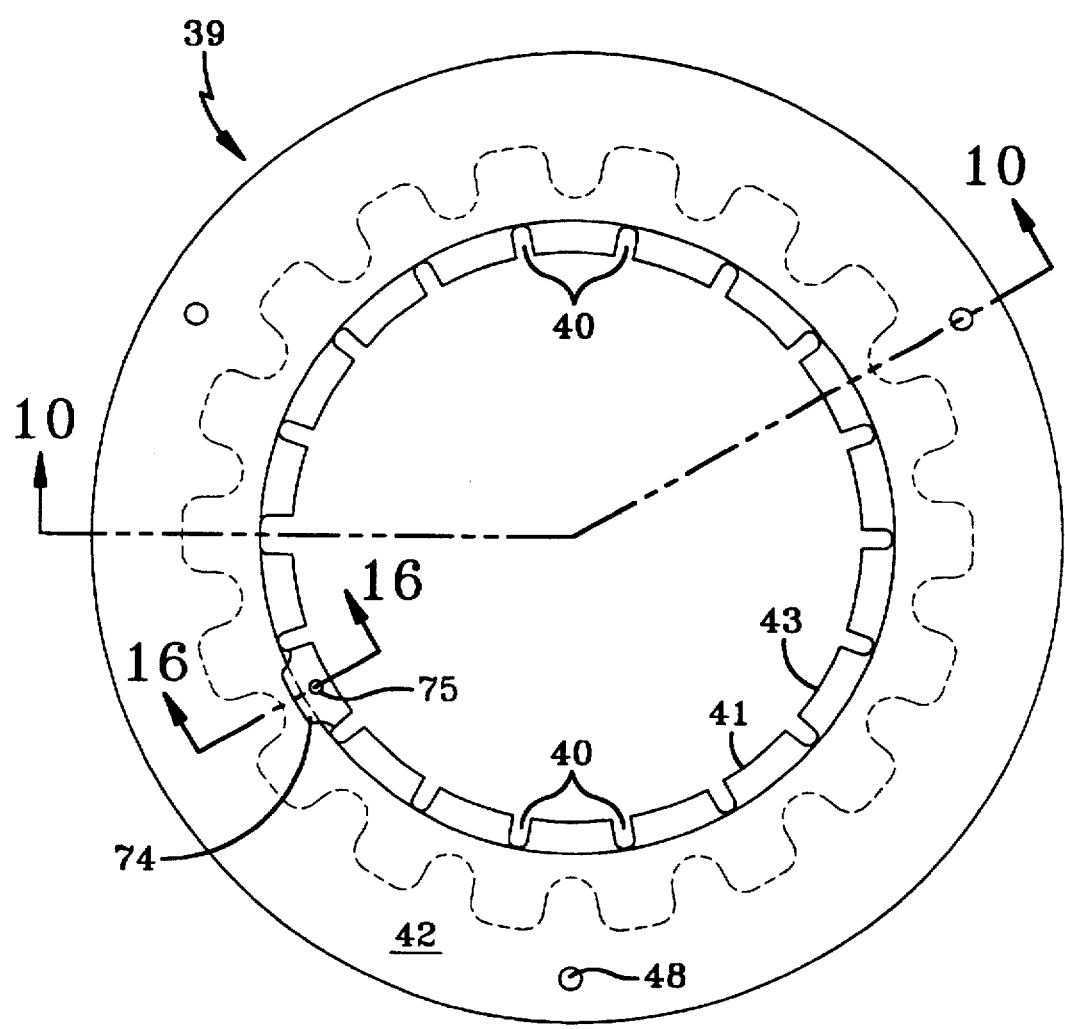
FIG. 9 is a plan view of a friction disk (stator) according to the invention.
Figure 10:
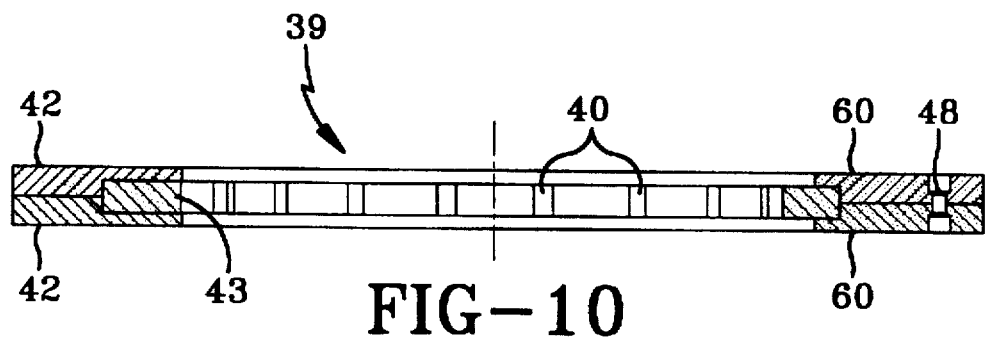
FIG. 10 is a sectional view taken along line 10—10 of FIG. 9.
Figure 11:
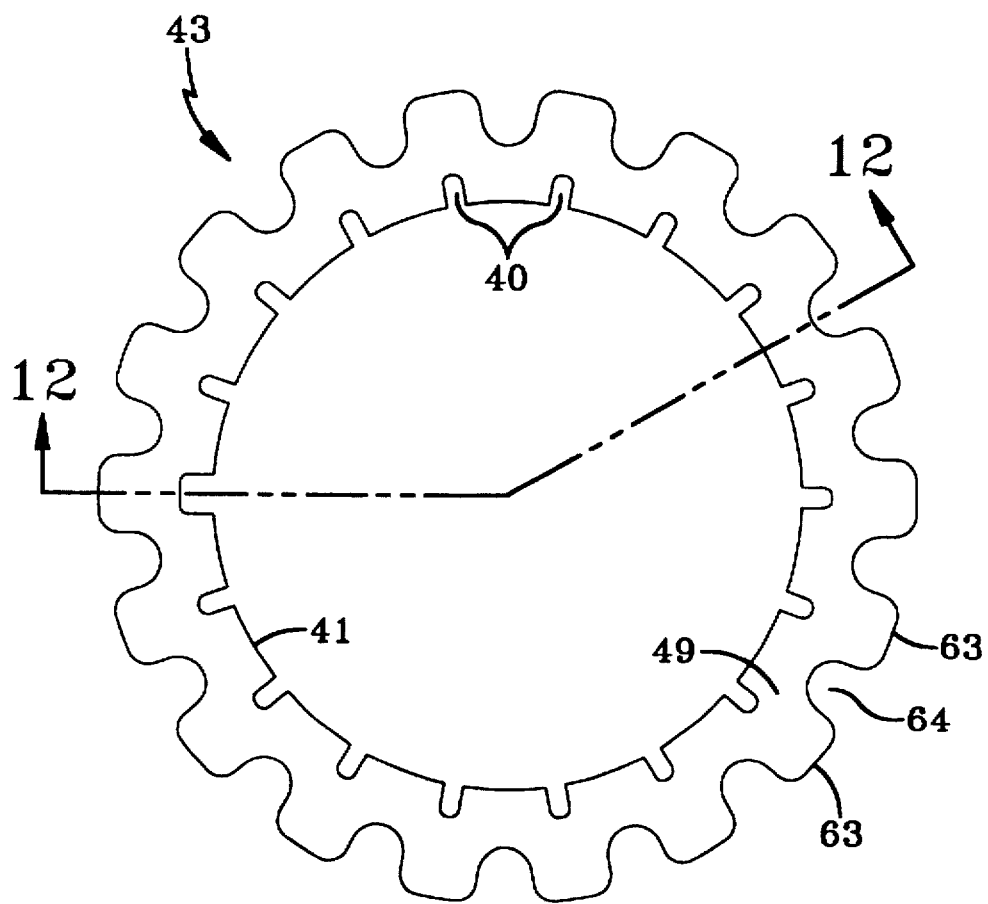
FIG. 11 is a plan view of the carrier of the friction disk of FIG. 10.
Figure 12:
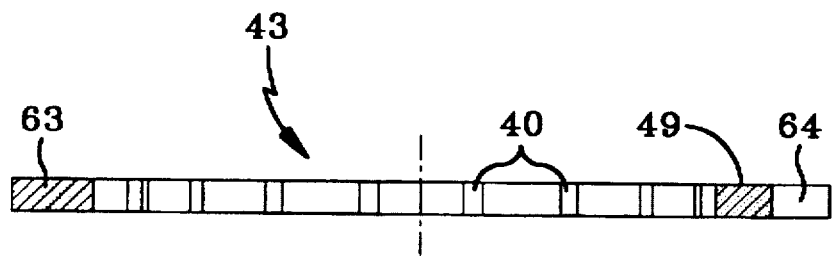
FIG. 12 is a sectional view taken along line 12—12 of FIG. 11.
Figure 13:
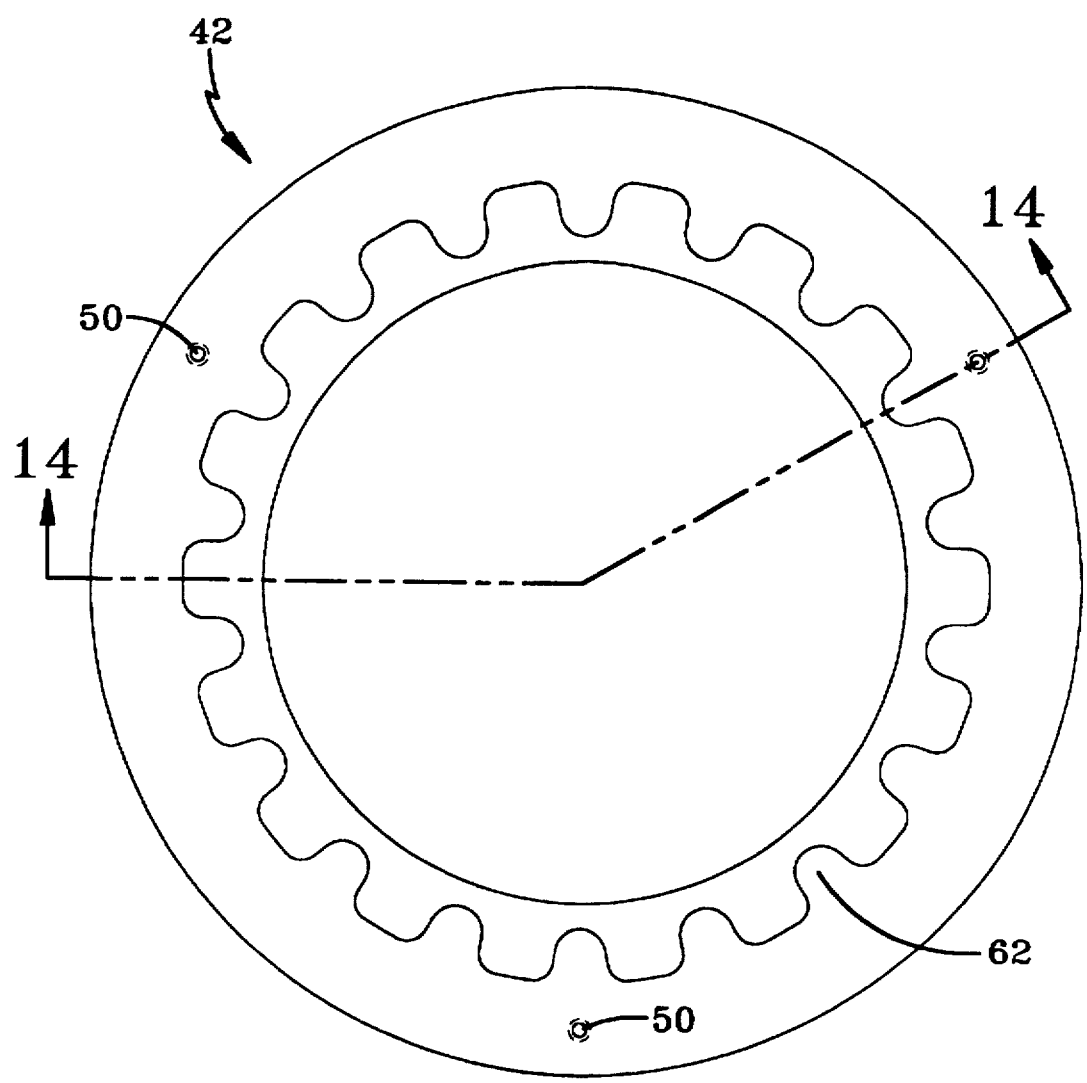
FIG. 13 is a plan view of a friction lining of the friction disk of FIG. 9.
Figure 14:
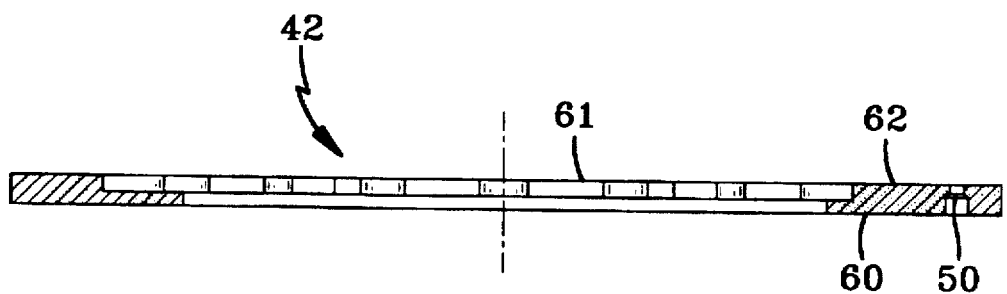
FIG. 14 is a sectional view taken along line 14—14 of FIG. 13.
Figure 16:
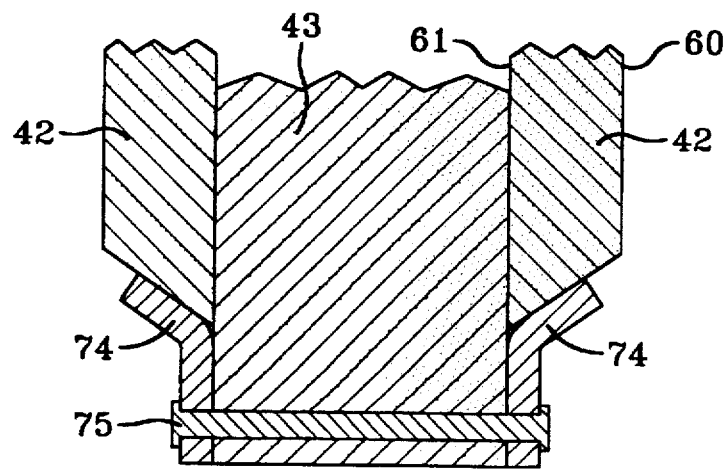
FIG. 16 is an enlarged sectional view taken along line 16—16 of FIG. 9.

It should be understood that while the construction of a rotor disk 44 is described in detail above, the principles of the invention may be likewise advantageously employed in the constuction of a stator disk 39 as shown in FIGS. 1, 2 and 9–14. In the case of a stator disk 39, the drive notches 40 of the carrier 43 are formed on its inner circumference for engagment with the splines 35 of the torque tube 32 rather than on its outer periphery as in the case of a rotor disk 44. As shown in FIGS. 11 and 12, the annular carrier 43 of a stator disk 39 includes a circumferentially extending radially inner strap 49 provided at circumferentally spaced intervals with radially outwardly extending legs 63. In the particular embodiment shown in FIGS. 9 through 12, the carrier 43 includes an inner circumferentially extending strap 49 defining its inner periphery 41, with a plurality of legs 63 each subtending an arc and extending radially outwardly from the strap 49 but not to the outer periphery of stator disk 39. The arcuate extent of each leg 63 overlaps and spans beyond the arcuate extent of the associated drive notch 40 to minimize the stresses developed between the drive notch and the recess 64 between the associated pair adjacent legs 63. The plurality of spaces or recessed regions 64 between legs 63 are devoid of any material. The junctions of the radially extending legs 63 with the circumferentially extending strap 49 and the tips of legs 63 preferably are generously radiused to minimize stresses; this also provides bearing area for transfer of torque-induced forces between the friction lining 42 and the carrier 43 during a braking action. As shown in FIG. 16, the radially inner peripheral edges of stator linings 42 may be beveled and operatively engaged by the flared extensions of a plurality of retainer clips 74 (only one clip is illustrated in FIGS. 9 and 16) to retain linings 42 on stator carrier 43. A pair of retainer clips 74 are secured to opposite sides of carrier 43 by rivet 75.

The construction of pressure plate 38 is similar to that of stator 39, except that the recessed regions of carrier 37 are not cut all the way through the thickness of the carrier, and the carrier is provided with drive notches 40 around its inner periphery rather than its outer periphery. The friction lining 42 of the pressure plate 38 may be and preferably is identical to that of the stator disks 39, and is secured to carrier 37 by rivets 48 passing through the raised areas 62 of the linings and recessed regions 34 of the carrier. The depth of the recessed regions of carrier 37 may be slightly greater than or equal to, but is preferably slightly less than the height of the raised areas 62 of the friction lining 42 to ensure that the raised areas of the friction lining bear on the bottom of the recessed regions when a clamp load is applied. When the carrier 37 of pressure plate 38 is formed of carbon composite of about 0.65 inch thickness and the lining is formed of carbon, a thickness clearance of from zero to about 0.003 inch is preferably provided.

The construction of the end plate 36 is dependent on the design of the reaction end of the torque tube 32. As illustrated in FIG. 1, where the torque tube 32 includes a flared reaction end 33 having a plurality of torque transfer buttons 58 secured thereto, the carrier 80 of the end plate 36 may be provided with a plurality of torque transfer recesses 57 for engagement with the plurality of torque transfer buttons 58. The friction lining 42 may be secured to its carrier by a plurality of rivets 48 which pass through the regions of greatest thickness of the friction lining and recessed regions of the carrier. Alternatively, as shown in FIG. 2, where the design of the torque tube provides a series of splines for engagement by corresponding notches formed on the inner periphery of the carrier of the end plate, the end plate 36 may be of a construction similar or identical to that of the pressure plate 38. As a further alternative, where the design of the torque tube provides a series of splines for engagement by corresponding notches formed on the inner periphery of the carrier of the end plate, the end plate and pressure plate may be of the same construction as stator disk 39.

When the friction linings 42, 52 have become sufficiently worn that they must be replaced, it is merely necessary to remove the rivets 48 or retainer clips 74, 72, remove the worn friction linings, position new friction linings on either side of the carrier and rivet or clip the new friction linings into place. With the possible exception of the pressure plate 38 and end plate 36 when constructed differently than stators 39, rivets when used preferably do not pass through apertures in the carrier. Thus, there is little risk of damage to the carriers 45 of the rotor disks 44 and carriers 43 of the stator disks 39 during refurbishment. No machining of the carrier or the friction lining is normally necessary when replacing the linings.

The thickness of the carriers at their drive notches 40 is comparable to those of conventional carbon brakes to assure long life and the ability to be relined several times. The thickness of the wear faces 60, 59 of the friction linings 42, 52 may be set to provide groups of friction disks of differing thicknesses or wear portions as taught in U.S. Pat. Nos. 4,613,017 and 4,742,895 to Bok to further reduce the costs of manufacture and operation.

As an example only and not intended to limit the invention, the thickness of a carbon composite carrier for a carbon lined brake assembly suitable for use on a Boeing 747-400 aircraft is about 0.65 inches. The thickness of the friction linings for this same application when formed of carbon is about 0.55 inches in the raised areas, and about 0.22 inches elsewhere.

The carrier 37, 43, 45 may be formed of any suitable material chosen primarily for its structural properties, and secondarily for its heat capacity and thermal conductivity. The carrier may advantageously formed of carbon and/or ceramic material, preferably one that is a fiber reinforced composite, designed for structural strength and resistance to oxidation at the intended operating conditions. When the carrier is formed of carbon composite material, it is preferable that the carrier be treated against oxidative attack. This may be accomplished using known protective treatments, e.g. as taught in U.S. Pat. No. 5,401,440 to Stover et al. and U.S. Pat. No. 4,837,073 to McAllister et al. The composite carriers may be provided with drive notch reinforcement of a different material such as steel or other high service temperature alloy such as that available under the trademark STELLITE.

Figure 17:
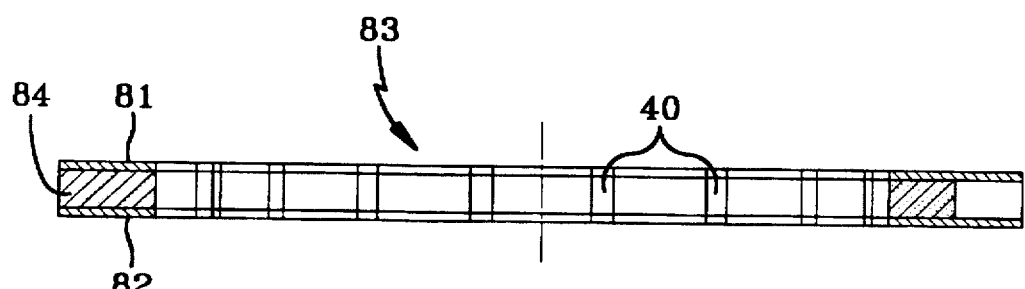
FIG. 17 is a sectional view of an alternate embodiment of a friction disk carrier according to the invention.

As shown in FIG. 17, an alternate embodiment of a friction disk or brake according to the invention includes a carrier 83 of laminate construction. Laminated carrier 83 includes a composite core 84 similar or identical to carrier 43 shown in FIG. 12 and one or more metallic plates such as top plate 81 and bottom plate 82 that reinforce the recessed regions of the carrier. The profile of plates 81, 82 in plan view is identical to that of the associated composite core 84. Reinforcing plates 81, 82 may be formed of high service temperature material such as type 1722 steel available from The Timken Company or other alloy such one available under the trademark INCONEL. Alternatively, the laminated carrier may include a two or more composite members and/or one or more reinforcing plates of metal. When a laminated carrier according to the invention is used, the height of the raised areas on the obverse side of the friction lining must be great enough to accomodate the anticipated thermal expansion (increase in thickness) of the laminated carrier during operation. As an example only and not intended to limit the invention, for a laminated carrier suitable for use on a Boeing 747-400 aircraft, the thickness of the composite core may be about 0.45 inch and the thickness of the top and bottom reinforcing plates may be about 0.10 inch.

Comparative testing of an aircraft brake assembly incorporating rotor and stator brake disks according to the invention against an otherwise identical aircraft brake assembly in which each rotor and stator disk is a single piece of the same overall size and shape and fiber reinforced carbon composite material indicated that brake disks according to the invention have much greater damping and thus much greater dynamic stability against undesired vibration during a braking action compared to solid disk constructions. For greatest dynamic stability, all rotor and stator disks of the heat sink are preferably made according to the invention. However, dynamic stability of a multi-disk brake can be enhanced by substituting only a portion of the traditional solid single-piece disks with disks according to the invention, e.g., all the stators excepting the pressure plate and the end plate, or all the rotors, or only a portion of the stators or the rotors, or only a portion of both stators and rotors.

It would be apparent that, although a specific embodiment of the invention has been described in detail, the invention is not limited to such specifically illustrated and described construction since variations may be made without departing from the principles of the invention.

What is claimed is:

1. A friction disk comprising an annular carrier of carbon or ceramic material including a plurality of recessed regions and a plurality of torque drive notches spaced around its circumferential direction, and an annular friction lining of carbon or ceramic material mounted on the carrier, the friction lining having a flat wear face and an obverse face including raised areas having walls corresponding to and matingly engaging the walls of the recessed regions of the carrier to provide torque transfer capability between the lining and the carrier.

2. The disk of claim 1 having increased dynamic stability against vibration during a braking event compared to single-piece disk of the same material.

3. The disk of claim 1 wherein the the depth of the recessed regions of the carrier is the same as or slightly less than the height of the raised areas of the lining.

4. The disk of claim 1 wherein the depth of the recessed regions of the carrier is slightly greater than the height of the raised areas of the lining.

5. The disk of claim 1 wherein the carrier includes a circumferentially extending strap having a plurality of legs extending radially therefrom and engaging the raised areas of the friction lining, and one of said recessed regions between each pair of adjacent legs.

6. The disk of claim 5 wherein the strap defines the radially outer periphery of the carrier and the legs and the recessed region between each pair of adjacent legs extend radially inwardly therefrom, the strap including a plurality of drive notches spaced around its circumference, each leg subtending an arc of more than twice the arc subtended by the associated drive notch, the arc of each leg overlapping the arc of the associated drive notch.

7. The disk of claim 5 wherein the strap defines the radially inner periphery of the carrier and the legs and the recessed region between each pair of adjacent legs extend radially outwardly therefrom, the strap including a plurality of drive notches spaced around its radially inner periphery, each leg subtending an arc that is greater than the arc subtended by the associated drive notch, the arc of each leg overlapping the arc of the associated drive notch.

8. The disk of claim 5 wherein the radial extent of the legs is less than that of the wear face of the friction lining and the recessed regions extend completely through the thickness of the carrier.

9. The disk of claim 1 wherein the friction lining includes apertures provided with mechanical fasteners that retain the friction lining on the carrier without passing through the carrier.

10. The disk of claim 1 wherein the friction lining is free of apertures in its swept area and is secured to its associated carrier by mechanical fasteners that are associated with the drive notches of the carrier.

11. The disk of claim 5 including a pair of friction linings on opposite sides of the carrier in which the raised areas of one of the friction linings are in contact with the raised areas of the other of the friction linings when mounted on the carrier, and portions of the carrier legs extending between the raised areas of the friction linings are in contact with the obverse side of the friction lining during a braking action.

12. The disk of claim 2 including a pair of friction linings on opposite sides of the carrier in which the raised areas of one of the friction linings are in contact with the raised areas of the other of the friction linings when mounted on the carrier.

13. The disk of claim 3 including a pair of friction linings on opposite sides of the carrier in which the raised areas of one of the friction linings are in contact with the raised areas of the other of the friction linings when mounted on the carrier.

14. The disk of claim 5 including a pair of friction linings on opposite sides of the carrier in which the raised areas of one of the friction linings are in contact with the raised areas of the other of the friction linings when mounted on the carrier.

15. The disk of claim 6 including a pair of friction linings on opposite sides of the carrier in which the raised areas of one of the friction linings are in contact with the raised areas of the other of the friction linings when mounted on the carrier.

16. The disk of claim 7 including a pair of friction linings on opposite sides of the carrier in which the raised areas of one of the friction linings are in contact with the raised areas of the other of the friction linings when mounted on the carrier.

17. The disk of claim 8 including a pair of friction linings on opposite sides of the carrier in which the raised areas of one of the friction linings are in contact with the raised areas of the other of the friction linings when mounted on the carrier.

18. The disk of claim 9 including a pair of friction linings on opposite sides of the carrier in which the raised areas of one of the friction linings are in contact with the raised areas of the other of the friction linings when mounted on the carrier.

19. The disk of claim 10 including a pair of friction linings on opposite sides of the carrier in which the raised areas of one of the friction linings are in contact with the raised areas of the other of the friction linings when mounted on the carrier.

20. The disk of claim 1 in which the carrier and the friction lining are formed of the same type of material.

21. The disk of claim 1 in which the carrier and the friction lining are formed of different materials.

22. The disk of claim 1 in which the carrier is formed from a material having a different thermal conductivity than the material from which the friction lining is formed.

23. The disk of claim 1 in which the carrier is formed from a material having a greater structural strength and greater resistance to oxidation than the material from which the friction lining is formed.

24. The disk of claim 1 in which the carrier further includes a composite core and one or more metallic plates reinforcing the recessed regions of the carrier.

25. A method of refurbishing a worn friction disk comprising an annular carrier of carbon or ceramic material including a plurality of recessed regions and a plurality of torque drive notches spaced around its circumferential direction, and a friction lining of carbon or ceramic material mounted on the carrier, the friction lining having a flat wear face and an obverse face including raised areas having walls corresponding in shape and height and matingly engaging the walls of recessed regions of the carrier that correspond in shape and depth to provide torque transfer capability between the lining and the carrier, the method comprising replacing the worn friction lining with new friction lining of carbon or ceramic material to provide a desired assembly thickness, the new friction lining having a flat wear face and an obverse face including raised areas having walls corresponding to and matingly engaging the walls of recessed regions of the carrier to provide torque transfer capability between the lining and the carrier.

26. The method of claim 25 wherein the new friction lining is secured relative to the carrier by rivets passing through apertures in the raised areas of the lining.

27. The method of claim 25 wherein the new friction lining is free of aperatures in its swept area and is secured to its associated carrier by mechanical fasteners that are associated with the drive notches of the carrier.

28. The method of claim 25 further including securing new friction linings on opposite sides of the carrier with the raised areas of one of the friction linings in contact with the raised areas of the other of the friction linings and with the portions of the obverse side of the friction linings that extend between the raised areas of the friction linings in contact with the carrier during a braking action.

29. An aircraft brake assembly having a brake stack comprising a plurality of interleaved stator and rotor friction disks wherein at least one of the disks in the brake stack comprises an annular carrier comprised of carbon or ceramic material and including a plurality of recessed regions and a plurality of torque drive notches spaced around its circumferential direction, and a friction lining of carbon or ceramic material mounted on the carrier, the friction lining having a flat wear face and an obverse face including raised areas having walls corresponding to and matingly engaging the walls of the recessed regions of the carrier to provide torque transfer capability between the lining and the carrier.

30. The brake assembly of claim 29 having increased dynamic stability against vibration during a braking event compared to an otherwise identical brake having a brake stack of the same carbon or ceramic material and devoid of any disk comprising an annular carrier comprised of carbon or ceramic material and including a plurality of recessed regions and a plurality of torque drive notches spaced around its circumferential direction, and a friction lining of carbon or ceramic material mounted on the carrier, the friction lining having a flat wear face and an obverse face including raised areas having walls corresponding to and matingly engaging the walls of the recessed regions of the carrier to provide torque transfer capability between the lining and the carrier.

* * * * *